United States Patent Office.

JOHN WM. McKEE, OF STOUTLAND, MISSOURI.

PROCESS OF PRESERVING EGGS.

SPECIFICATION forming part of Letters Patent No. 345,065, dated July 6, 1886.

Application filed January 25, 1886. Serial No. 189,729. (No specimens.)

*To all whom it may concern:*

Be it known that I, JOHN WM. MCKEE, of Stoutland, in the county of Camden and State of Missouri, have invented a new and useful Improvement in Processes of Preserving Eggs, of which the following is a description.

My invention is in the nature of a process for preserving eggs against decay; and to that end it consists in the peculiar treatment which I will now describe.

In carrying out my process I mix and powder charcoal, one-fourth ounce; chlorate of potash, one-fourth ounce; nitrate of potash, (pure,) three ounces; cinnamon, two and one-half ounces; sulphur, (pure,) one and one-fourth pound. After these are thoroughly incorporated they form a powder which, when ignited, gives off fumes of sulphurous acid—one of the reagents that I employ. The eggs are now put in an air-tight casing in suitable trays to keep them from rolling and breaking. A bottle of bromine (about an ounce) is uncorked and set in the bottom of the compartment containing the eggs, which compartment may be three feet by two feet and five feet high. A dish containing the sulphurous compound above mentioned is then set in the upper part of the compartment and the compound set on fire, and the eggs are then subjected in the close compartment to the fumes of sulphurous acid, which descend, and the bromine, which rise, and the movement of the fumes of the bromine carries the sulphurous-acid fumes back or upward again, thus forming a current that surrounds the eggs on all sides alike. The eggs are left in the case for about four hours.

The eggs, after being taken from the casing containing the sulphurous acid, are immersed in a liquid which is compounded as follows: I take thirty gallons of soft water and put into it thirteen pounds of unslaked lime and five pounds of common salt. After being mixed and allowed to settle, I take twenty-five gallons of this clear liquid and into it put a solution composed of pulverized soda, six ounces; pulverized cream of tartar, three ounces; pulverized citric acid, one-fourth ounce; pulverized nitrate potash, four ounces; pulverized chlorate of potash, one ounce; pulverized borax, six ounces; pulverized alum, one ounce, with water, one gallon. The eggs are immersed in this solution, are allowed to remain, and will there keep sweet and fresh for several years.

I find that the liquid last described may to advantage be subjected to the sulphurous-acid fumes in the casing along with the eggs.

Having thus described my invention, what I claim as new is—

The process herein described of preserving eggs, which consists in subjecting the same to the fumes of sulphurous acid and bromine, and then immersing the same in a solution of lime, salt, cream of tartar, citric acid, nitrate of potash, chlorate of potash, borax, alum, and water, substantially as and for the purpose described.

JOHN WM. McKEE.

Witnesses:
FRANK B. TIPTON,
PIERCE THOMPSON.